March 3, 1970 R. MAGERS 3,498,356
APPARATUS FOR GROOVING TIRES
Filed Oct. 17, 1967 2 Sheets-Sheet 2
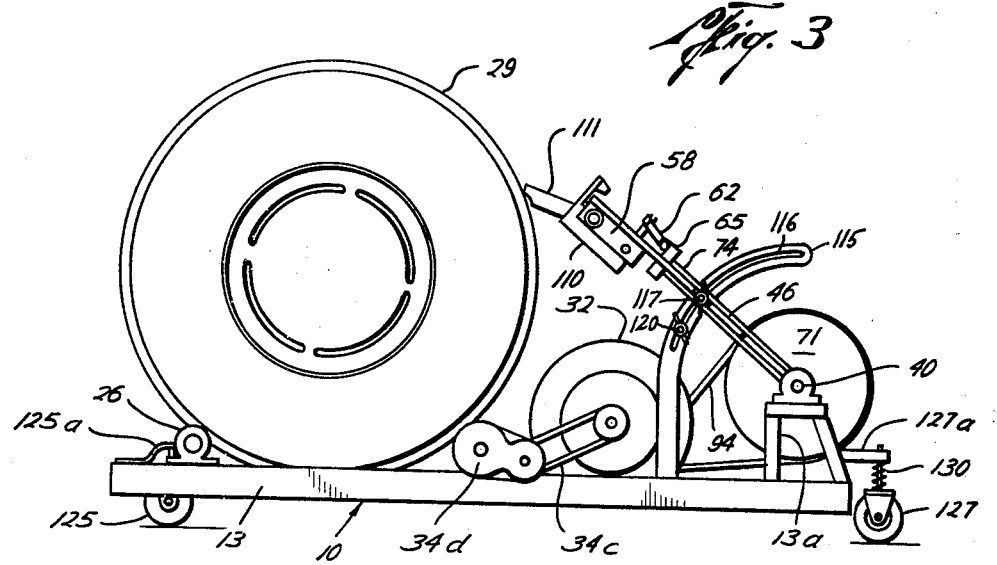
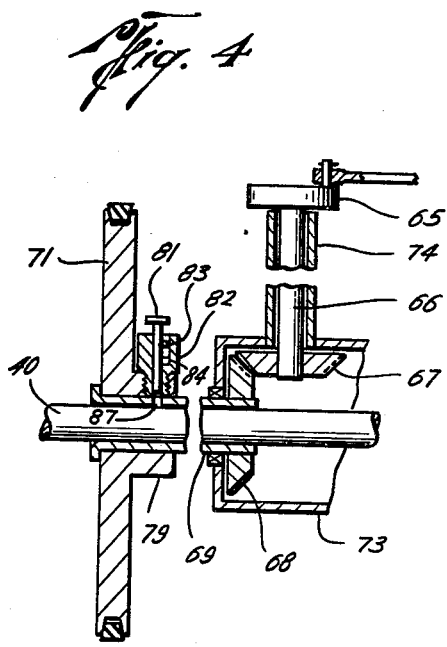
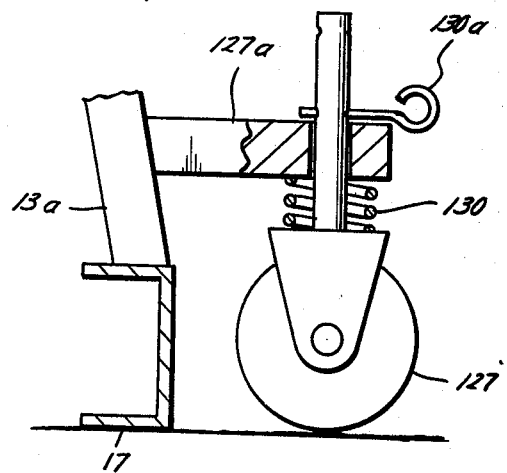
INVENTOR.
Roscoe Magers
BY Carl B. Fox, Jr.
ATTORNEY

United States Patent Office 3,498,356
Patented Mar. 3, 1970

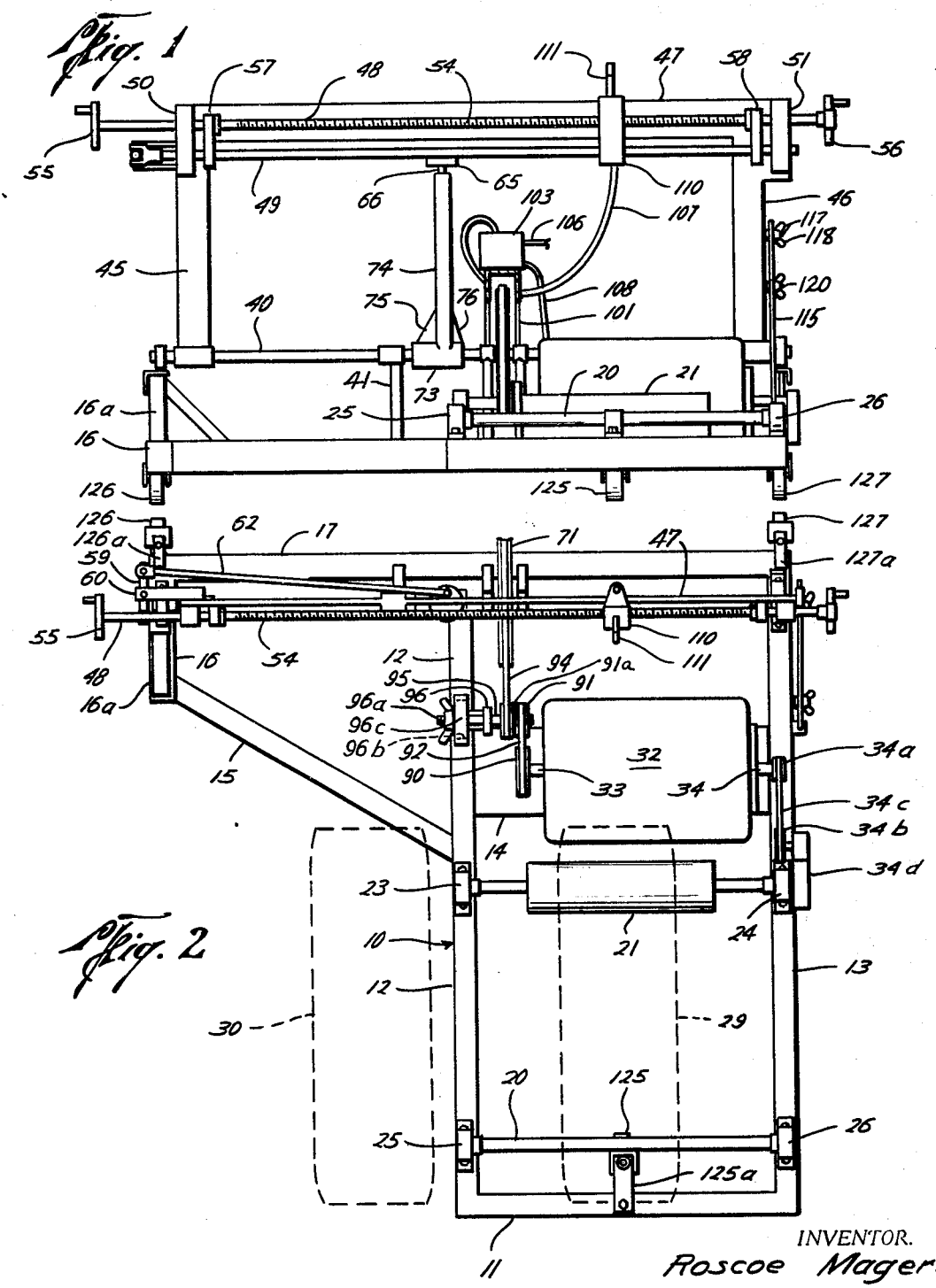

3,498,356
APPARATUS FOR GROOVING TIRES
Roscoe Magers, Houston, Tex., assignor of fifty percent to Lloyd Leo Magers, Warren, Mich.
Filed Oct. 17, 1967, Ser. No. 675,961
Int. Cl. B29h 21/08
U.S. Cl. 157—13       8 Claims

ABSTRACT OF THE DISCLOSURE

The disclosure is of apparatus for grooving tires. The apparatus has simplified arrangements for advancing the cutter toward and away from the tire, and has provision for easily and accurately removing the groove cutter laterally of the tread face of the tire in order to move the groove to the correct position for cutting a groove. The apparatus may be employed for cutting grooves in both tires of a dual wheel arrangement without removing and remounting the tires and wheel on the apparatus.

BACKGROUND OF THE INVENTION

Field of the invention

The field of the invention is the field relating to the grooving, or regrooving, of tires. The grooving is accomplished by use of a heated cutter, and the tire is rotated as each groove is cut.

Description of the prior art

The prior art includes Patent Nos. 2,919,749 and 3,075,575, each of which discloses an apparatus for grooving tires. Patent No. 2,924,267 discloses apparatus for cross-slitting the tread faces of tires.

The problems incident to the prior art which are solved by the invention herein disclosed include the problem of adjustment of the cutting element in its movements toward and away from the tread surface of a tire, and in moving the cutter laterally with respect to the tread surface of the tire in order to move the cutter to a desired location for cutting of a groove. Prior apparatuses do not wholly solve the above problems in that the provisions for these movements of the cutter are of complex and complicated nature, whereas the present invention solves these problems by providing the adjustments for cutter movements both to and away from the tire, and laterally thereof, simple, dependable, and easily operable. Moreover, the present apparatus, being simplified, is lighter in weight and of less cost than prior apparatuses.

SUMMARY OF THE INVENTION

The invention resides in the provision of simplified apparatus for providing the functions for grooving, or regrooving, the tread grooves of tires. The required movements of the cutter are provided in simple and direct manners whereby unnecessary complication of the apparatus is avoided.

BRIEF DESCRIPTION OF THE DRAWINGS

FIG. 1 is a front elevation of a preferred embodiment of apparatus according to the invention.

FIG. 2 is a plan view of the apparatus shown in FIG. 1.

FIG. 3 is a side elevation of the apparatus of FIGS. 1 and 2 taken from the right of the apparatus as shown in FIG. 1.

FIG. 4 is an enlarged vertical cross section showing a portion of the apparatus shown in the other drawing figures.

FIG. 5 is a partial elevation, partly in vertical cross section, showing a wheel mounting included in the apparatus.

DESCRIPTION OF THE PREFERRED EMBODIMENTS

The preferred embodiment of the apparatus shown in the drawings will now be described. An open horizontal frame 10 is made up of plural frame elements 11–17. The frame elements are connected integrally together in the form shown by welding or in other suitable manner. The frame may take other forms satisfactory for the support of the elements carried thereon.

A roller 20 and a driven roller 21 of larger diameter are disposed laterally across the space between frame members 12, 13. Four bearings 23–26 each mounted on the frame rotatively support the opposite ends of each of the rollers. The rollers are provided to accommodate and support a tire. The tire is preferably supported mounted upon the wheel of a vehicle with the wheel in place on the vehicle. In other words, either the vehicle wheel is driven to place upon the apparatus or is elevated and the apparatus moved therebeneath. The position of the tire is indicated in FIG. 2 by dashed showing 29. The apparatus will also accommodate both tires of a dual wheel mounted on the apparatus simultaneously, with the grooves of each tire cut successively. The second tire of such a dual wheel arrangement is indicated by dash line showing 30.

An electric drive motor 32 is fixed above frame member 14 between frame elements 12–13. Motor 32 has drive shafts 33, 34. Drive shaft 34 drives roller 21 rotatively through pulleys 34a, 34b, belt 34c and gears 34d. Any other suitable drive train may be provided for the roller.

A pivotally movable frame is made up of beam members 45, 46 and crossbeam member 47 affixed between the upper ends of members 45, 46. Brackets 13a, 16a extending above the frame members 13, 16, respectively, each support one end of a bar 40. Bar 40 is also supported at element 41 affixed at its lower end to frame element 17. Beams 45, 46 are rotatively affixed about bar 40 at their lower ends, for rotation in planes transverse to the length of the bar. Elongate cylindrical shafts 48, 49 are longitudinally slidably disposed through spaced holes of bearing elements 50, 51 which are affixed at the upper ends of beams 45, 46. Shaft 48 is rotatable in bearings 50, 51 as well as being slidably longitudinally moveable therethrough. Shaft 48 is threaded except at its ends, the threads being indicated by reference numeral 54. A crank or other handle 55, 56 is provided at each end of shaft 48 for rotation of the shaft.

Shafts 48, 49 are coupled together for longitudinal movement together at connection elements 57, 58 through which each of the shafts is disposed, shaft 49 being firmly connected to elements 57, 58 by set screws (not shown). Shaft 48 has small shoulders against which elements 57, 58 are positioned.

A lever 59 is pivotally supported at its center by bracket 60 affixed to beam 47. One end of lever 59 is pivotally connected to the end of shaft 49, and the other end of lever 59 is pivotally connected to the end of a rod 62. The other end of rod 62 is connected eccentrically to circular wheel or disc 65. Disc 65 is mounted at its center on the upper end of shaft 66 which has at its lower end a bevel gear 67 (see FIG. 4). Bevel gear 67 engages a second bevel gear 68 mounted on an end of sleeve 69 on the other end of which is mounted a pulley 71. Sleeve 69, gear 68, and pulley 71 are rotatively disposed around rod 40. Rotation of pulley 71 causes rotation of disc 65 through sleeve 69, gear 68, gear 67, and shaft 66. Gears 67, 68 are within housing 73 through which rod 40 extends. Shaft 66 is rotatable within tubular housing 74. Gusset plates 75, 76 brace housing 74.

Pulley 71 has hub 79 which is rotatable about sleeve 69, or which may be connected to sleeve 69 for rotation of sleeve 69. Bolt 81 is moveable inwardly and outwardly through fitting 82, the movement being by movement of pin 83 in a J-slot 84. Thus, bolt 81 may be moved radially inwardly so that its inner end is engaged in perforation 87 of sleeve 69, so that sleeve 69 will rotate with pulley 71. When the bolt 81 is not engaged in perforation 87 the sleeve 69 is not rotated by rotation of pulley 71. It will be understood that when disc 65 is rotated by the elements just described, the drive for rotation of disc 65 being provided by rotation of pulley 71, then rod 62 and shafts 48, 49 connected thereto will be reciprocatingly moved back and forth. The purpose of this movement will be described.

Pulley 90 on motor shaft 33 drives double pulley 91 through belt 92. Belt 94 on the other pulley of the double pulley drives pulley 71. Double pulley 91 is mounted on shaft 95 supported on a pivotal rocker 96, the position of which is movable by moving the position of bolt 96a in arcuate slot 96b of pedestal fitting 96c. The central vane 91a of double pulley 91 is movable. When rocker 96 is moved to move the double pulley 91 toward pulley 90 and away from pulley 71, the central vane 91a of the double pulley moves to the right, as shown in FIG. 2, so that belt 92 runs higher and belt 94 runs lower in the respective pulley belt slots. When rocker 96 is moved to move the double pulley 91 away from pulley 90 and toward pulley 71, the central vane 91a of the double pulley moves to the left, as shown in FIG. 2, so that belt 92 runs lower and belt 94 runs higher in the respective pulley belt slots. These movements of the double pulley change the ratio of the two pulleys of the double pulley, and this in turn changes the rate of rotation of wheel or disc 65, which changes the rate or speed of longitudinal reciprocating movement of rod 62. The change in the rate of longitudinal reciprocation of rod 62 alters the back and forth movements of the cutter assembly 110 and cutter 111 so that the zigzag grooves are made longer or smaller. The rate of rotation of the tire in which the groove is cut is maintained constant so that when double pulley 91 is moved toward pulley 90 and away from pulley 71, the cutter 111 is moved back and forth at a slower rate so that the zigzag grooves cut have larger zigzags. When double pulley 91 is moved away from pulley 90 and toward pulley 71, the cutter is moved back and forth at a faster rate so that the zigzag grooves cut have smaller zigzags. The sizes of the zigzags may then be made smaller or larger by a simple adjustment to match previous zigzags or to suit the users desire.

A guard 101 mounted on frame 10 is provided about belts 92 and 94. A switch box 103 is mounted atop the guard. Electrical power from any suitable source is provided through conductor 106 to the switch box. Conductors 108 controlled by a switch of switch box 103, supplies electrical power to motor 32. Conductors 107, controlled by a switch of switch box 103, supplies electrical power, provide heat to the knife or cutter of cutter assembly 110. Groove cutter assembly 110 has extending therefrom a heated cutter 111 of a form known in the art. Heat for element 111 is provided electrically, through use of resistance or in other known manner.

As has been described, beams 45, 46 are pivotal at their lower ends about rod 40. Their pivotal movement is controlled by curved retainer bar 115 having a longitudinal slot 116 therethrough along a portion of its length. A bolt 117 extending outwardly from beam 46 is received through slot 116 and has a wingnut 118 screwed thereon. A movable stop screw 120 is provided through slot 116. Tightening of wingnut 118 fixes the pivotal position of beams 45, 46. Screw 120 may be positioned to fix the lowest position to which beam 46 may be pivoted.

Cutter element 110 is provided with an internally threaded passage the threads of which engage the threads 54 of shaft 48. When either or both of handles 55, 56, is rotated the threads 54 are rotated and cutter 110 is moved longitudinally of shaft 48, back or forth across the positions of tires 29, 30. Thus, cutter 110 may be conveniently moved to any position at any point crossways of the tread surfaces of the tires 29 and at 30. Of course, only tire 29 may be in place, and tire 30 will be in place only if the tires are on a dual wheel.

Frame 10 is moveably supported, except when the weight of a tire and vehicle is imposed thereon, by three identical wheels 125, 126, 127. The wheels 127 are of caster form for movement of the frame in any direction over the ground. Each wheel is biased downwardly by a spring 130 (see FIG. 5) which is compressed when weight is imposed upon the frame through rollers 20, 21. Thus, the frame is elevated when weight is not imposed and springs 130 are not compressed, so that the apparatus may be readily rolled in any direction over the ground or other surface, but when weight is imposed upon the frame, the springs 130 are compressed so that the frame moves downwardly to against the ground to be supported thereon and to be restrained by friction with the ground against movement therealong. Arms 125a, 126a, 127a attached to the frame are perforate to receive the wheel spindles each retained by a pin 130a.

In operation of the apparatus for cutting a groove in the tread surface of a tire, the tire is positioned on rollers 20, 21 as described with the tread surface against each of the rollers. Cutter assembly 110 is moved to the appropriate crossways position of the tread surface by a rotation of either or both handles 55, 56. The beams 45, 46 are moved pivotally to bring cutter 111 against the tread surface of the tire by appropriate manipulation of wingnut 118 and movement of bolt 117 in slot 116 of arcuate support 115. The depth of penetration of cutter 111 into the tread surface of the tire may be controlled by adjustment of the positions of bolt 117 and stop bolt 120, or by positioning the pivotal frame by hand. For cutting a zigzag grove the bolt 81 is set in its inward position with its inner end in perforation 87 and held in that position by pin 83 in the lateral part of the J-slot 84. For cutting a straight groove, the bolt 81 is moved outwardly by moving pin 83 outwardly in J-slot 84. When bolt 81 is engaged in perforation 87 for forming a zigzag groove, rotation of disc 65 as described causes reciprocating movements of cutter 110 back and forth as the tire is continuously rotated by drive roller 21 in the manner which has been described. Thus, as the tire rotates the cutter moves back and forth so that a zigzag groove is formed in the tread surface of the tire. The tire rotates upwardly at the cutter. Plural (usually four) spaced grooves are cut around the tread surface of the tire.

Because of its simplicity, the apparatus is of light weight and may be easily moved and lifted by hand, and when upon the ground may be easily rolled to the desired position for cutting grooves in a tire or for placement for storage. Only two adjustments of the apparatus are required for forming a groove in a tire, namely, the cutter 110, 111 is moved crossways of the tire tread surface by rotation of one or both handles 55, 56, and the beams 45 and 46 are pivoted to correct position by rotation about rod 40. Thus, grooves may be rapidly cut in the tread surfaces of either one or two tires mounted on the apparatus as described. No prior apparatus has provided for the grooving of two tires of a dual wheel assembly. For dual tire grooving, one tire is grooved by successive movements, groove to groove, of the number and spacing of grooves required for the tire, then the cutter is moved to the second tire and the plural tire grooves cut therein.

As has been stated, the apparatus is almost always used with the tires mounted on the wheels of a vehicle and with the wheels in place on the vehicle. Therefore, to cut grooves in the tires of a vehicle, the vehicle is moved, or the grooving apparatus is moved, and each tire of the vehicle may be grooved successively without complication.

While a preferred apparatus according to the invention has been shown and described, many modifications thereof may be made by a person skilled in the art without departing from the spirit of the invention, and it is intended to protect by Letters Patent all forms of the invention falling within the scope of the following claims.

I claim:

1. Apparatus for cutting circumferential grooves in the tread surface of a tire, comprising frame means having spaced parallel roller means for engagement with the tread surface of a tire to support the tire for rotation, means for rotating one of said roller means to rotate a tire supported thereon, said frame means including a pivotal frame pivotally movable to and away from the trend surface of a tire supported on said roller means, elongate threaded means rotatably supported horizontally across said pivotal frame, groove cutter means supported by said pivotal frame having an internally threaded passage therethrough engaging the threads of said elongate threaded means whereby said groove cutter means is movable in either direction along said pivotal frame by rotation of said elongate threaded means in a suitable direction of rotation, said groove cutter means being movable with said pivotal frame to the tread surface of a tire to cut a circumferential groove therearound as the tire is rotated, said groove cutter means being movable along said pivotal frame as described to any selected transverse location across the tread surface of the tire for the cutting of a groove at that location.

2. The combination of claim 1, said pivotal frame and said threaded means extending beyond one end of said roller means sufficiently that when one tire of a pair of tires mounted on a dual wheel is placed as described on said roller means, said cutter means is movable transversely to cut grooves in the tread surfaces of each of said tires.

3. The combination of claim 1, including zigzag means for reciprocating said threaded means longitudinally whereby said cutter means cuts a zigzag groove as the tire is rotated when said zigzag means is engaged and whereby said cutter means cuts a straight groove as the tire is rotated when said zigzag means is released.

4. The combination of claim 3, including adjustable means for limiting the pivotal movements of said pivotal frame.

5. The combination of claim 4, said frame means being supported by downwardly spring-biased wheel means the springs of which are overcome by the downward force of a tire mounted on the wheel of a vehicle supported on said roller means to bring said frame means into contact with the surface upon which the apparatus is disposed.

6. The combination of claim 5, including an electric motor supported on said frame means, said zigzag means comprising rotatable wheel means and rod means pivotally connected eccentrically thereto at one end and connected to said threaded means at its other end, a first drive train connecting said motor to said rotatable wheel means for rotation thereof, said first drive train including coupling means for providing said release and engagement of said zigzag means, second drive train means connecting said motor to said one of said roller means and comprising said rotating means therefor.

7. The combination of claim 6, said first drive train means comprising a first pulley having drive belt means therearound engaged around a second pulley on the drive shaft of said motor, said first pulley being rotatable about the axis of pivot of said pivotal frame, said first pulley being rotatably mounted about a sleeve having first bevel gear means therearound engaged with second bevel gear means carried on shaft means having said zigzag providing wheel means mounted for rotation therewith; bar means disposed transversely across said pivotal frame having said cutter means slidably engaged therearound, said bar means being parallel to and spaced from said threaded means and slidably engaging said pivotal frame at its ends, means at the ends of the threads of said threaded means connecting said bar means and the threaded means together, said bar means preventing rotation of said cutter means about said threaded means.

8. The combination of claim 7, said drive belt means of said first drive train means including a first belt engaged around said first pulley and a second belt engaged around said second pulley, double pulley means having movable vane means between the belt slots thereof to change the size ratio between the belt slots engaged with said first belt in one belt slot thereof and with said second belt in the other belt slot thereof and being movable toward and away from said respective first and second pulleys and away from and toward said respective first and second pulleys, whereby the speed of rotation of said zigzag providing wheel means may be adjusted by moving the position of said double pulley means to change the size of the zigzags cut by said cutter means.

References Cited

UNITED STATES PATENTS

| | | | |
|---|---|---|---|
| 2,000,129 | 5/1935 | Dunnam | 157—13 |
| 2,350,375 | 6/1944 | Stephens | 157—13 |
| 2,919,749 | 1/1960 | Love | 157—13 |
| 3,097,685 | 7/1963 | Woodard | 157—13 |

GRANVILLE Y. CUSTER, JR., Primary Examiner